Oct. 12, 1943.  E. L. ALLEN ET AL  2,331,288
CROSS BAR STRUCTURE FOR ENDLESS TRACKS
Filed Jan. 28, 1942  3 Sheets-Sheet 1

INVENTORS:
EDWIN L. ALLEN
HAROLD B. MUSTER
BY Hyde and Meyer
ATTORNEYS.

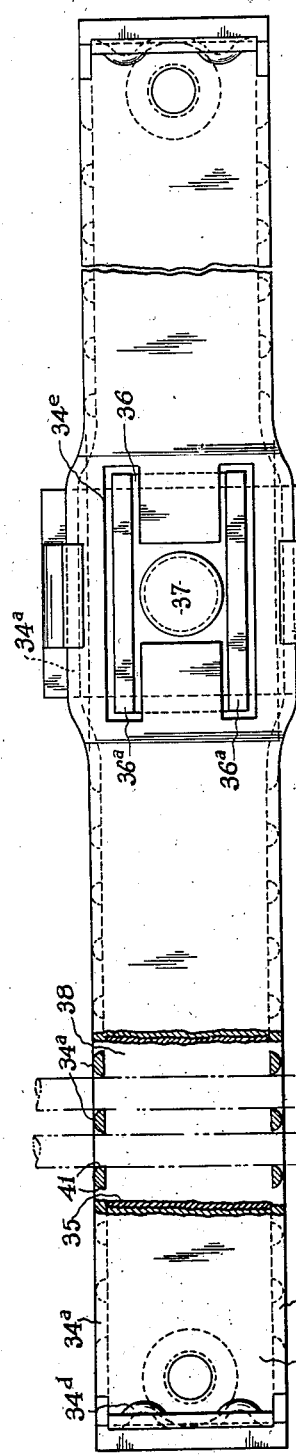
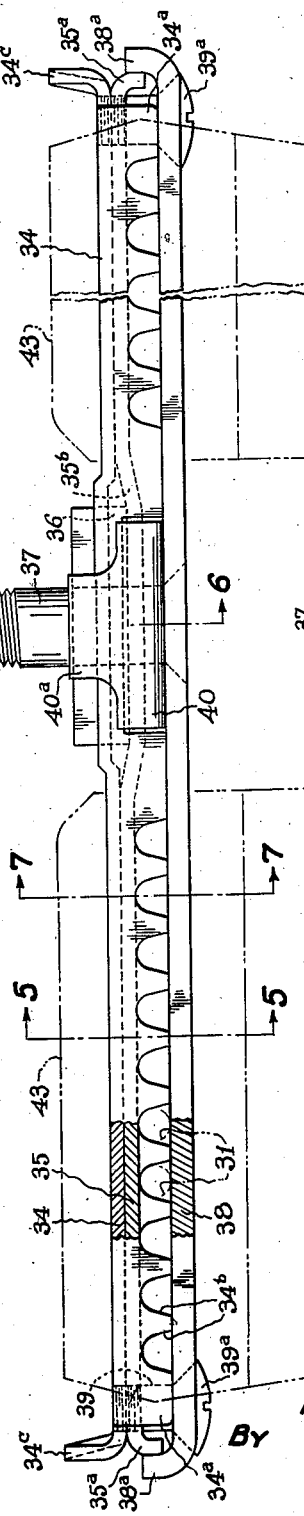
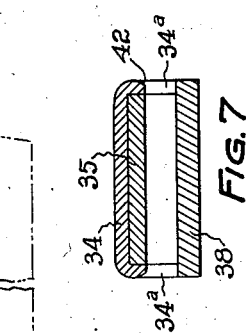
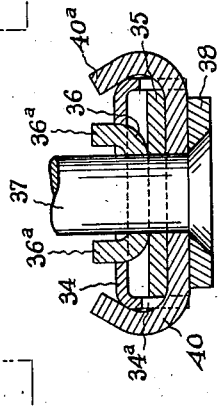
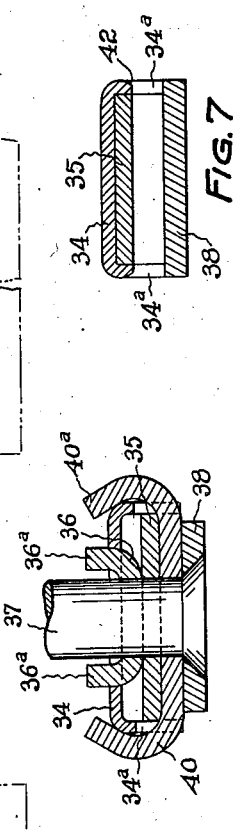
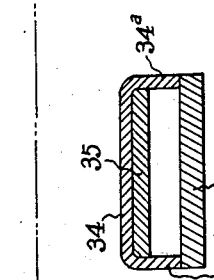

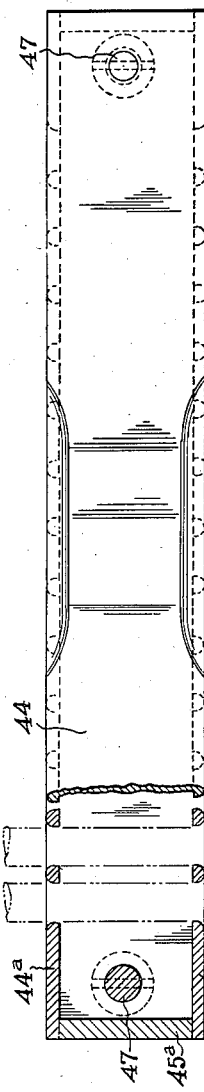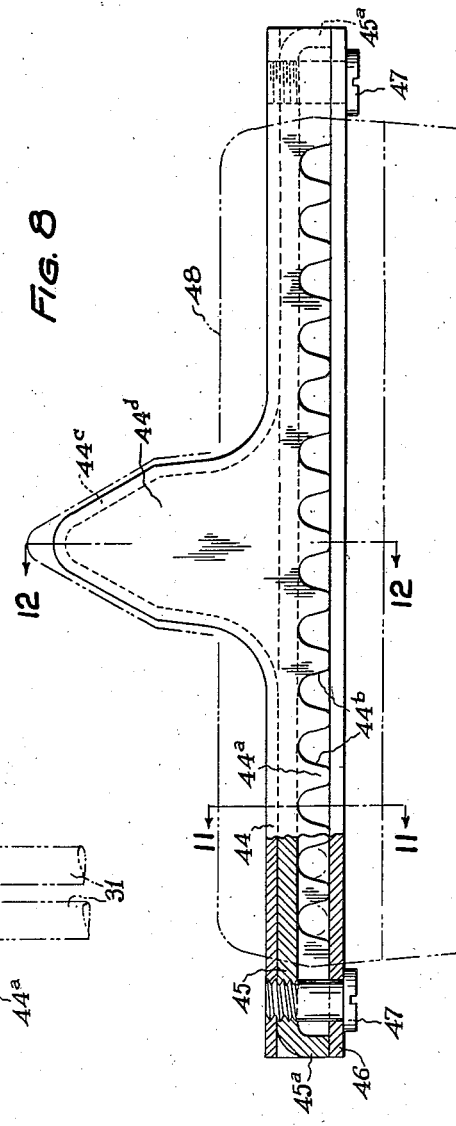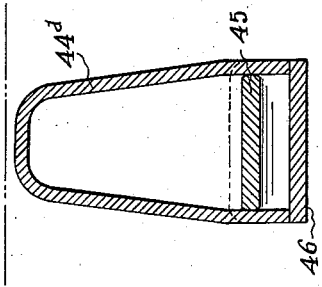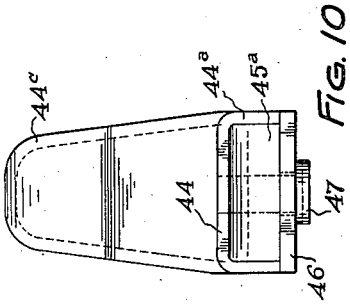

Patented Oct. 12, 1943

2,331,288

UNITED STATES PATENT OFFICE 2,331,288

CROSSBAR STRUCTURE FOR ENDLESS TRACKS

Edwin L. Allen and Harold B. Muster, Cleveland Heights, Ohio, assignors to Rudolph I. Schonitzer, Shaker Heights, Ohio Application January 28, 1942, Serial No. 428,524

7 Claims. (Cl. 305—10)

This invention relates to improvements in crossbar structures for flexible endless belt-like tracks for use on tractors, tanks and other vehicles of the self-laying track type.

An object of the present invention is to provide a crossbar structure made of metal plates which have been subjected to stamping, slotting, bending, welding and similar operations, to provide a crossbar structure which is suitable for mass production, which requires no machining, which has great uniformity as to size, which has hard wearing surfaces, and which is cheap to produce.

Among the specific objects of the present invention is to provide a crossbar structure wherein plate members have notched flanges struck up from the metal of the plate adapted to lie between and to properly space parallel cables in the endless track.

Another object is to provide a crossbar structure built up of a plurality of plate members formed to provide the necessary strength with a minimum of weight and wherein a plurality of plates are welded together to reinforce each other.

Another object of the present invention is to provide a crossbar structure of the type described wherein the parts are of simple form, which are cheaply made and easily secured together.

Other objects and advantages of the present invention will be apparent from the accompanying drawings and description and the essential features will be set forth in the claims.

In the drawings, Fig. 1 is a fragmental side elevational view of a portion of a flexible endless track equipped with our invention.

Figs. 3 to 7 are views of one form of crossbar, Fig. 3 being a top plan view partly broken away to more clearly show the construction, Fig. 4 being a side elevational view of the crossbar of Fig. 3, and Figs. 5, 6 and 7 being sectional views taken along similarly numbered lines of Fig. 4.

Figs. 8 to 12 show a modified form of a crossbar, Fig. 8 being a top plan view partly broken away to more clearly show the construction, Fig. 9 being a side elevational view of the same, Fig. 10 being an end elevational view of the same, and Figs. 11 and 12 being sectional views taken along similarly numbered lines of Fig. 9.

Our improved crossbar structure is intended for the same type of use as the crossbars 12 and 12' shown in United States Patent No. 2,107,490 granted February 8, 1938 to Robert Mayne, although they are not necessarily restricted to exactly the type of track there described. In other words the track need not be formed of an endless rubber belt and the track is not necessarily composed of two parallel endless belts but may comprise a single width of belt as shown in the modified form herein disclosed in Figs. 8 to 12.

Figure 1:
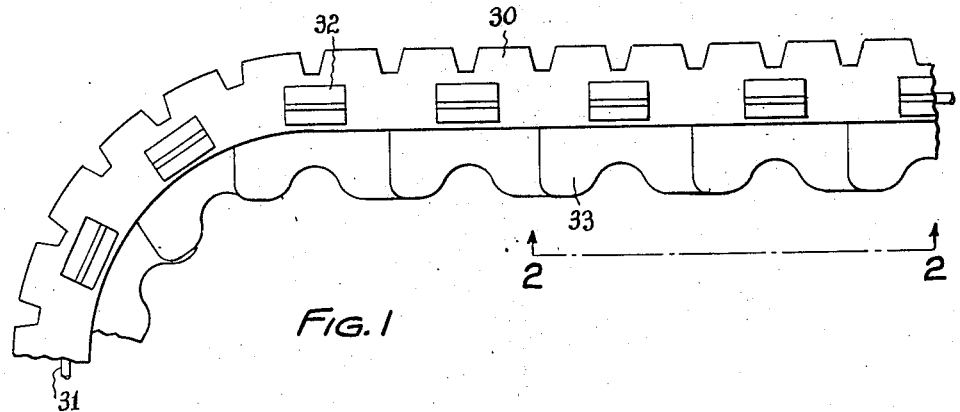
Figure 2:
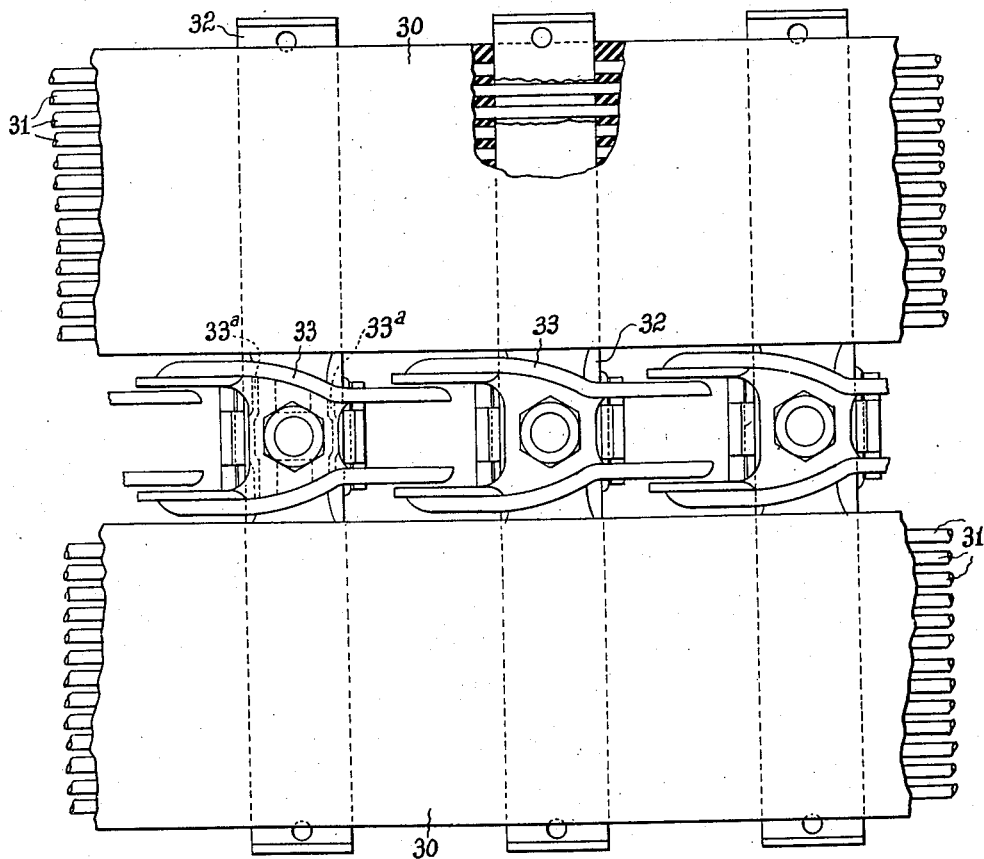
Fig. 2 is an enlarged fragmental bottom plan view of a portion of Fig. 1, taken from the position of the line 2—2 of Fig. 1.

Referring to Figs. 1 and 2, the flexible endless track comprises a pair of spaced vulcanized rubber tread bands 30 preferably but not necessarily continuous, which are reinforced by laterally spaced parallel strands of wire cable 31 which extend longitudinally of the track. This provides a smooth running tread which increases traction, reduces noise and vibration, and by the enclosure of the cables prevents corrosion thereof. All of the strands of the cable are attached at spaced intervals to metal crossbars 32 having suitable means provided for receiving and spacing the cables 31. This invention relates to improvements in the structure of these crossbars 32.

In one form of the device shown there is included a series of guides 33 secured to the crossbars 32 in the space between the flexible tracks 30 for the purpose of keeping the track in longitudinal alinement and to provide means for engagement with a driving sprocket. A similar construction is shown at 15 in the above mentioned Mayne patent and certain portions of the present structure are designed to coact with similar track guide members.

The crossbar of Figs. 3 to 7 comprises upper and lower subassemblies secured together by screw fastenings. The upper subassembly comprises a plate member 34 which extends the full length of the double track shown in Fig. 2. This plate member is of the full width of the crossbar and has side flanges 34a extending transversely of the track and bent downwardly substantially at right angles to the general plane of the plate member. The side flanges are notched out as shown at 34b to receive the cables 31 in the notches. The outer ends of this plate member are turned upwardly as at 34c and reinforced with strengthening ribs as at 34d to provide means for the attachment of grousers used to provide better traction when the going is heavy. At its center this plate member has a cut-out portion 34e substantially of H-form to permit some positioning abutments to extend up from below as will be later described.

A strengthening plate member 35 extends generally parallel to the main portion of the plate member 34 and lies between the parallel flanges 34a. This plate member is preferably secured to the plate 34 by welding so that one plate reinforces the other. The ends of the plate 35 are flanged downwardly as shown at 35a for strengthening purposes and to coact with the lower subassembly as will presently appear. The central portion of plate 35 as indicated at 35b is bent downwardly slightly and between the plate members 34 and 35 at the center is secured a U-shaped plate member 36. This plate has the upstanding flanges 36a which form positioning abutments adapted to coact with portions 33a of a guide 33 which may be of the type shown in our copending application Serial No. 409,394, filed September 3, 1941. The plates 35 and 36 have a central hole to receive a connecting stud bolt 37 as will later appear.

A driving member 40 completes the upper subassembly. This driving member has tongues 40a centrally located on each side and bent upwardly to coact with the driving sprocket which drives the track. This driving member is secured to the upper subassembly preferably both by welding and by the bent-over tongues 40a. It will be noted from Figs. 3 and 6 that the flanges 34a are drawn outwardly at the center to lie against the tongues 40a in a manner to reinforce them.

The lower subassembly comprises a plate 38 which extends the full length and width of the crossbar and abuts against the lower edges of the flanges 34a thus closing the notches and holding the cables therein. The ends of this plate are flanged upwardly as at 38a, thus coacting with the flanges 35a to close the end of the crossbar and to strongly reinforce it. Near the ends of the plate 38 are countersunk holes to receive the heads 39a of countersunk bolts 39 which are threaded into suitable openings in plates 34 and 35 to hold the upper and lower subassemblies together. The plate 38 is assembled with a central stud bolt 37 adapted to extend through all of the plates of the crossbar and rising above the crossbar for the purpose of securing the guides 33 to the crossbar.

It will be noted that the metal forming the notches at 34b is provided with coined edges as at 41 of Fig. 3 and at 42 of Fig. 7, so as not to cut into the cables 31. The upper and lower subassemblies are secured together by means of the bolts 39 with the cables 31 in their proper notches and suitably spaced. A plurality of these crossbars is then molded into the rubber track as indicated by the dot-dash lines 43 of Fig. 4.

A modified form of the device is shown in Figs. 8 to 12 inclusive. This form is intended to be incorporated in a type of track consisting of one endless rubber track equipped with a different type of guiding means for holding the track in longitudinal alinement. The upper subassembly of this modified form comprises a plate 44 having side edge flanges 44a bent downwardly and notched out as at 44b to receive the cables 31. The central portion of this plate 44 is bent or drawn upwardly as indicated at 44c to provide a guide centrally of the track. This projection extends oppositely to the flanges 44a and the ends of the projecting portion are closed at 44d by portions of plate 44 to prevent rubber entering the hollow center of the projection when the rubber track is molded about the crossbar. A reinforcing plate 45 extends the full length of the crossbar between the flanges 44a. The ends are bent down as at 45a for strength and to close the end of the crossbar. The plates 44 and 45 are secured to each other, preferably by welding.

The cables 31 are placed in the notches 44b and then a bottom plate 46 extending the full width and length of the crossbar is secured to the upper subassembly by means of the fillister head screws 47 which engage in suitable threaded openings in plates 44 and 45. A plurality of these crossbars are then molded into the rubber track, the outlines of which are shown at 48, Fig. 9.

What we claim is:

1. In a flexible endless track including spaced parallel cables extending lengthwise of the track and embedded in the material thereof, a crossbar extending transversely of the track and comprising a plate member having a flange extending at right angles to the general plane of the plate member and transversely of the track, there being notches in said flange adapted to receive said cables and to hold them properly spaced.

2. In a flexible endless track including spaced parallel cables extending lengthwise of the track and embedded in the material thereof, a crossbar extending transversely of the track and comprising a plate member extending transversely of the track, said plate member having parallel edge flanges extending transversely of the track, and said flanges having notched portions adapted to receive said cables and to hold them properly spaced.

3. In a flexible endless track including spaced parallel cables extending lengthwise of the track and embedded in the material thereof, a crossbar extending transversely of the track and comprising a plate member extending transversely of the track, said plate member having parallel edge flanges extending transversely of the track, said flanges having portions notched out to receive said cables, and a second plate member secured to said first named plate member and holding said cables in said notched portions.

4. In a flexible endless track including spaced parallel cables extending lengthwise of the track and embedded in the material thereof, a crossbar extending transversely of the track and comprising a plate member extending transversely of the track, said plate member having parallel edge flanges extending transversely of the track, said flanges having portions notched out to receive said cables, and a second plate member generally parallel to said first named plate member and welded thereto and lying between said flanges.

5. In a flexible endless track including spaced parallel cables extending lengthwise of the track and embedded in the material thereof, a crossbar extending transversely of the track and comprising two plate members secured together, a third plate member secured between said two first named plate members, upstanding projections on said third plate member, and a track guide secured to said crossbar in engagement with said projections, whereby said guide is properly positioned on said crossbar.

6. In a flexible endless track including spaced parallel cables extending lengthwise of the track and embedded in the material thereof, a crossbar extending transversely of the track and comprising two plate members secured together, a U-shape plate member secured between said two first named plate members and having generally parallel flanges extending through one of said first named plate members, and a track guide secured to said crossbar in engagement with said flanges, whereby said guide is held in proper position on said crossbar.

7. In a flexible endless track including spaced parallel cables extending lengthwise of the track and embedded in the material thereof, a crossbar extending transversely of the track and comprising a plate member extending transversely of the track, said plate member having parallel edge flanges extending transversely of the track, said flanges having notched portions to receive said cables and to hold them properly spaced, and said plate member having a portion thereof bent up in a direction opposite to said flanges to form a track guide.

EDWIN L. ALLEN.
HAROLD B. MUSTER.